United States Patent
Sumikawa

(10) Patent No.: US 10,978,729 B2
(45) Date of Patent: Apr. 13, 2021

(54) FUEL CELL HOUSING CASE

(71) Applicant: TOYOTA JIDOSHA KABUSHIKI KAISHA, Toyota (JP)

(72) Inventor: Hiroki Sumikawa, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 75 days.

(21) Appl. No.: 16/273,264

(22) Filed: Feb. 12, 2019

(65) Prior Publication Data

US 2019/0260058 A1 Aug. 22, 2019

(30) Foreign Application Priority Data

Feb. 22, 2018 (JP) .............................. JP2018-030101

(51) Int. Cl.
    *H01M 8/2475* (2016.01)
    *H01M 8/04858* (2016.01)
    *H01M 8/0202* (2016.01)

(52) U.S. Cl.
    CPC ....... *H01M 8/2475* (2013.01); *H01M 8/0202* (2013.01); *H01M 8/0488* (2013.01)

(58) Field of Classification Search
    CPC .................................................. H01M 8/2475
    USPC ......................................................... 429/469
    See application file for complete search history.

(56) References Cited

U.S. PATENT DOCUMENTS

2015/0197165 A1\* 7/2015 Katano .................. B60L 50/71
                                                            429/428

FOREIGN PATENT DOCUMENTS

JP         2014-146620 A      8/2014
JP         2017-168276 A      9/2017

\* cited by examiner

*Primary Examiner* — James M Erwin
(74) *Attorney, Agent, or Firm* — Dickinson Wright PLLC

(57) ABSTRACT

A fuel cell housing case includes: a stack case including a first partitioning plate and a second partitioning plate that separate a space in which a fuel cell stack is to be housed from a space in which a boost converter is to be housed; and a pair of stack bus bars provided on both ends in the stacking direction of the fuel cell stack, wherein the first partitioning plate and the second partitioning plate respectively include: slits through which the respective stack bus bars are inserted; and overlapping portions that overlap each other.

3 Claims, 9 Drawing Sheets

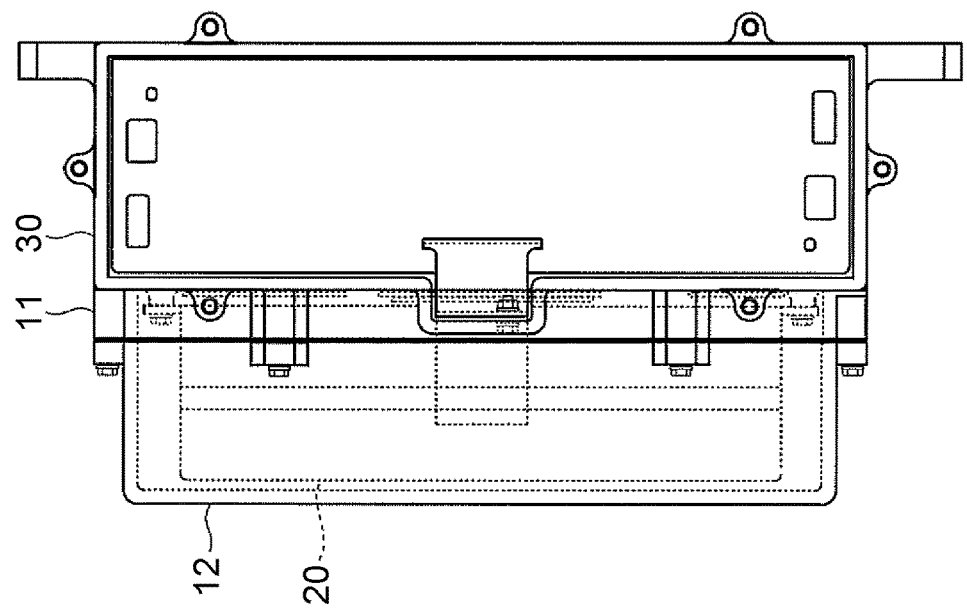
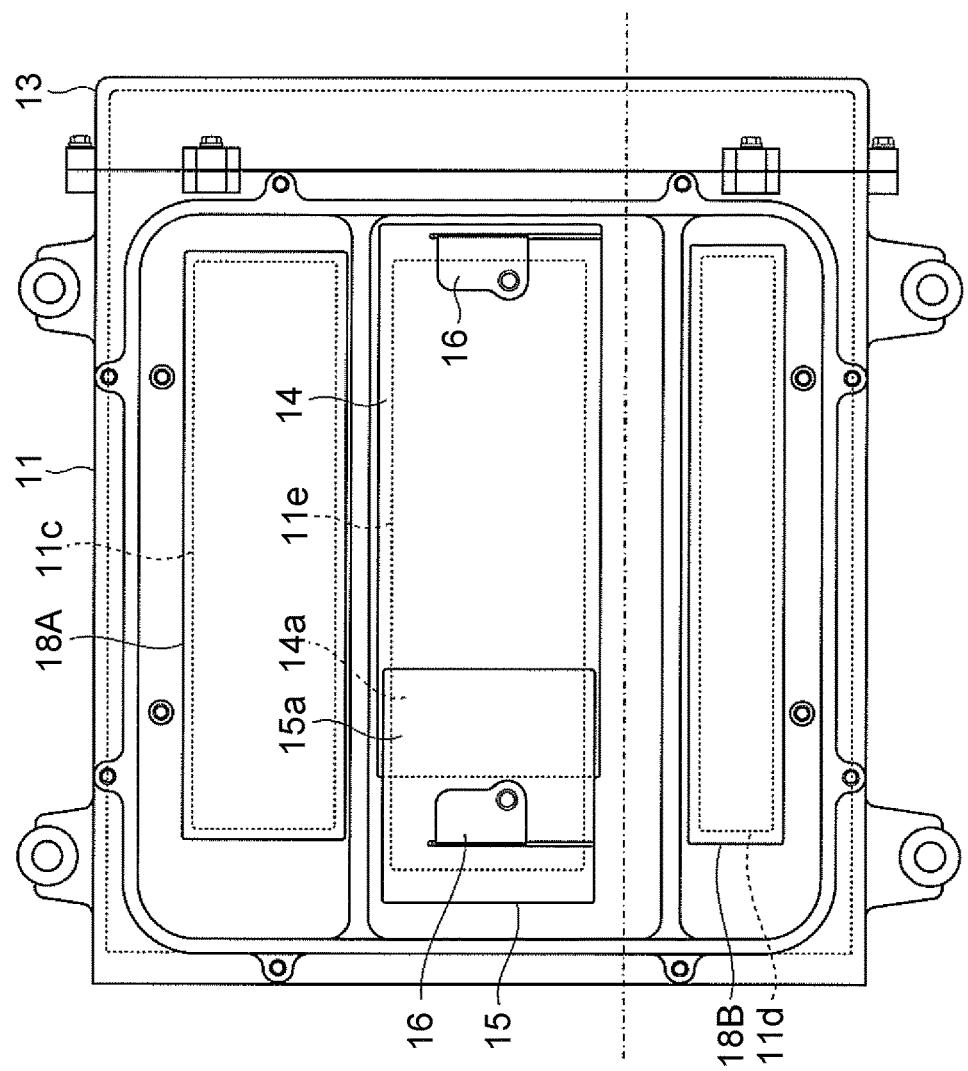

FUEL CELL HOUSING CASE

INCORPORATION BY REFERENCE

The disclosure of Japanese Patent Application No. 2018-030101 filed on Feb. 22, 2018 including the specification, drawings and abstract is incorporated herein by reference in its entirety.

BACKGROUND

1. Technical Field

The present disclosure relates to a fuel cell housing case housing a fuel cell stack and a boost converter.

2. Description of Related Art

As a fuel cell housing case of this type, a fuel cell housing case has been disclosed that houses: a fuel cell stack including multiple stacked single fuel cells; and a boost converter located above the fuel cell stack in the gravity direction (see Japanese Patent Application Publication No. 2017-168276 (JP 2017-168276 A)).

SUMMARY

A high voltage unit such as a boost converter is disposed upward in the gravity direction inside the fuel cell housing case described in JP 2017-168276 A, and the fuel cell stack is disposed below the high voltage unit. According to this configuration, it is required to provide partitioning plates to protect the fuel cell stack, inside the fuel cell housing case for the sake of preventing foreign matters coming from the high voltage unit from being mixed into the fuel cell stack located below the high voltage unit.

However, in order to transmit electric power generated by the fuel cell stack to the boost converter, it is required to provide bus bars that extend from the boost converter to the fuel cell stack; thus the boost converter and the fuel cell stack cannot be completely separated from each other. The fuel cell stack has variations in dimension in a stacking direction of the fuel cell stack due to variations in shape among the single fuel cells, and thus the pair of bus bars respectively provided at both ends in the stacking direction have variations in dimension, as well. Consequently, for example, if such a configuration that provides the partitioning plates with insertion portions for the bus bars and inserts the bus bars through the insertion portions is employed, there arises a problem that positions of the insertion holes vary among individual fuel cell stacks, which results in lack of general versatility; therefore, this configuration is not suitable as a solution to separate the boost converter and the fuel cell stack from each other.

The present disclosure provides a fuel cell housing case capable of separating a space in which a fuel cell stack is to be housed and a space in which a boost converter is to be housed from each other even when there are variations in dimension in the stacking direction of the fuel cell stack.

(1) An aspect of the present disclosure relates to a fuel cell housing case including: a stack case including a first partitioning plate and a second partitioning plate that separate a first space in which a fuel cell stack including multiple stacked single fuel cells is to be housed from a second space in which a boost converter disposed above the fuel cell stack in a gravity direction is to be housed; and a first bus bar and a second bus bar respectively provided on both ends in a stacking direction of the fuel cell stack and configured to electrically connect the fuel cell stack to the boost converter. The first partitioning plate includes a first insertion portion through which the first bus bar is inserted. The second partitioning plate includes a second insertion portion through which the second bus bar is inserted. The first partitioning plate and the second partitioning plate respectively include a first overlapping portion and a second overlapping portion that overlap each other in a state of being mounted on the stack case.

The fuel cell housing case according to the present disclosure described in the above (1) includes: the stack case housing the boost converter and the fuel cell stack; and the first bus bar and the second bus bar, and the inside of the stack case is partitioned into two spaces by the first partitioning plate and the second partitioning plate. The first partitioning plate and the second partitioning plate respectively include the first insertion portion and the second insertion portion through which the first bus bar and the second bus bar are respectively inserted. The first partitioning plate and the second partitioning plate respectively include the first overlapping portion and the second overlapping portion that overlap each other in a state of being mounted on the stack case. With this configuration, even when the fuel cell stack has variations in dimension in the stacking direction, the first overlapping portion of the first partitioning plate overlaps the second overlapping portion of the second partitioning plate, to thereby maintain the inner space of the stack case to be partitioned into two spaces. As a result, foreign matters coming from the boost converter can be prevented from being mixed into the fuel cell stack by the first partitioning plate and the second partitioning plate.

(2) The first overlapping portion and the second overlapping portion may be bonded to each other. According to this configuration, since the first overlapping portion of the first partitioning plate and the second overlapping portion of the second partitioning plate are bonded to each other, a gap between the respective overlapping portions of the first partitioning plate and the second partitioning plate is eliminated, to thereby more securely prevent foreign matters coming from the boost converter from being mixed into the fuel cell stack. In addition, the bonding between the overlapping portions enhances mechanical strength of the multiple partitioning plates.

(3) The first insertion portion may include a first slit, and the first slit may be sealed. The second insertion portion may include a second slit, and the second slit may be sealed. According to this configuration, since the first insertion portion and the second insertion portion respectively include the first slit and the second slit and the first slit and the second slit are respectively sealed, the gap is eliminated, and thus it is possible to more securely prevent foreign matters coming from the boost converter from being mixed into the fuel cell stack.

According to the present disclosure, it is possible to provide the fuel cell housing case capable of separating the space in which the fuel cell stack is to be housed and the space in which the boost converter is to be housed from each other even when the fuel cell stack has variations in dimension in the stacking direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4A is a plan view of a state in which an upper cover of the fuel cell housing case according to the embodiment of the present disclosure is taken off;

FIG. 4B is a front view of a front cover of the fuel cell housing case according to the embodiment of the present disclosure is taken off;

DETAILED DESCRIPTION OF EMBODIMENTS

Figure 1:
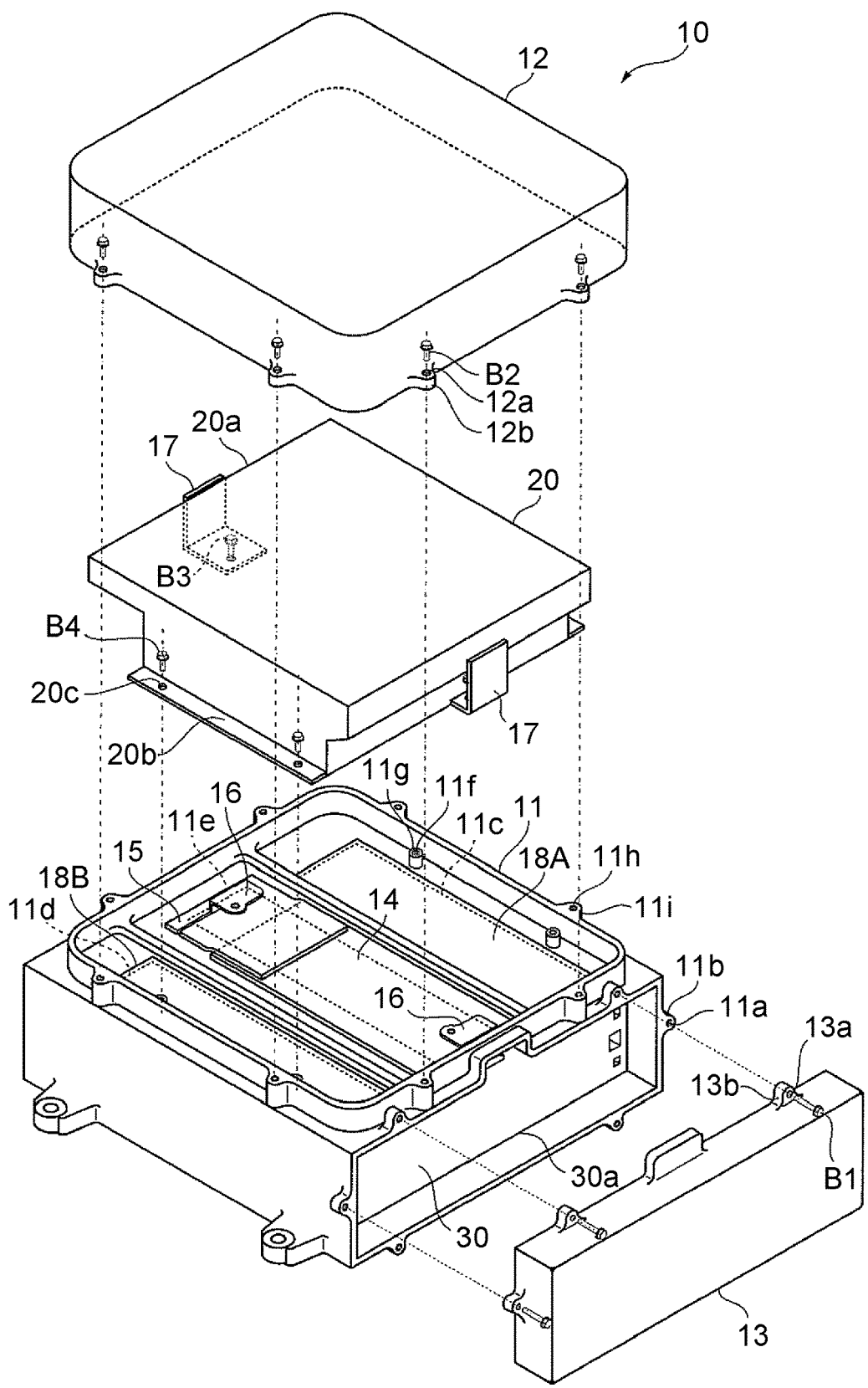
FIG. 1 is an exploded perspective view of a fuel cell housing case according to an embodiment of the present disclosure.

A configuration of a fuel cell housing case 10 according to the embodiment to which a fuel cell housing case according to the present disclosure is applied will be described with reference to drawings. As shown in FIG. 1, the fuel cell housing case 10 includes: a case body 11; an upper cover 12; a front cover 13; a first partitioning plate 14; a second partitioning plate 15; stack bus bars 16; unit bus bars 17; shield plates 18A, 18B; and bolts B1, B2, B3, B4.

The fuel cell housing case 10 houses a boost converter 20 upward in the gravity direction (hereinafter, referred to as an "upper position"), and also houses a fuel cell stack 30 below the boost converter 20 in the gravity direction (hereinafter, referred to a "lower position").

As shown in FIG. 1, FIG. 2A, FIG. 2B, FIG. 3, FIG. 4A, FIG. 4B, FIG. 5A, FIG. 6, the case body 11 is configured by a member in a box-like shape opening frontward, the member formed by casting of a metallic material such as aluminum or by plastic formation of fiber reinforced plastics or the like. The fuel cell stack 30 is housed inside the case body 11. The case body 11 is configured such that the boost converter 20 is mounted on a wall surface portion located at an upper position of the case body 11. Fixing portions 11b having screw holes 11a are provided at six positions around the opening. The bolts B1 are inserted into the screw holes 11a so as to fasten the front cover 13 to the case body 11.

In the case body 11, openings 11c, 11d, 11 e are formed in wall surface portions located at upper positions of the case body 11. The shield plate 18A is mounted on the opening 11c, and the shield plate 18B is mounted on the opening 11d. The first partitioning plate 14 and the second partitioning plate 15 described later are mounted on the opening 11e. In the case body 11, four bosses 11g having screw holes 11f are provided on wall surface portions located at upper positions of the case body 11. The bolts B4 are inserted into the screw holes 11f so as to fasten the boost converter 20 to the case body 11.

The case body 11 is configured such that eight fixing portions 11i having screw holes 11h are provided on wall surface portions located at upper positions of the case body 11, and the bolts B2 are inserted into the screw holes 11h so as to fasten the upper cover 12 to the case body 11.

As shown in FIG. 1, FIG. 2A, FIG. 2B, FIG. 3, FIG. 4B, FIG. 5A to 5C, and FIG. 6, as with the case body 11, the upper cover 12 is configured by a member in a box-like shape opening downward, the member formed by casting of a metallic material such as aluminum or by plastic formation of fiber reinforced plastics or the like. Fixing portions 12b having through-holes 12a are provided at eight positions around the opening. The bolts B2 are inserted into through-holes 12a.

As with the case body 11, the front cover 13 is configured by a member in a box-like shape opening toward the lateral side, the member formed by casting of a metallic material such as aluminum or by plastic formation of fiber reinforced plastics or the like. Fixing portions 13b having through-holes 13a are provided at six positions around the opening. The bolts B1 are inserted into the through-holes 13a. The front cover 13 is configured to be mounted on the opening of the case body 11 so as to pressurize the fuel cell stack 30 in the case body 11 in the stacking direction, to thereby fix the fuel cell stack 30 to the inside of the case body 11.

The case body 11, the upper cover 12, and the front cover 13 of the present embodiment are included in a stack case of the fuel cell housing case according to the present disclosure.

Figure 7A:
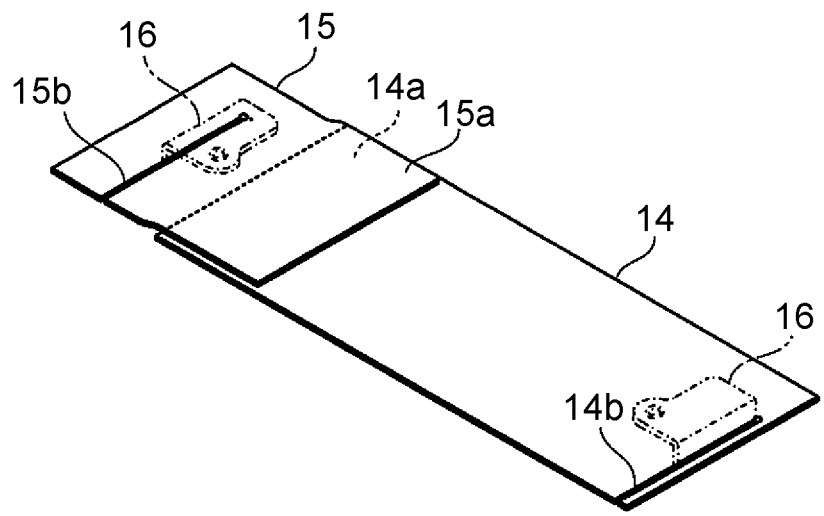
FIG. 7A is a view of a major part of the fuel cell housing case according to the embodiment of the present disclosure, and shows a perspective view of a movable partitioning plate and a fixed partitioning plate.

As shown in FIG. 7A, the first partitioning plate 14 is configured to be formed by a plate-like member made from a material having a high electric insulation, a high heat resistance, and an high elasticity, and be bonded to a wall surface portion at an upper position of the case body 11. In the present embodiment, the first partitioning plate 14 is configured by a synthetic resin material with softness, such as PET, and to be bonded to the case body 11 with a double-sided tape. The first partitioning plate 14 has an overlapping portion 14a that partially overlaps the second partitioning plate 15 in a state in which the first partitioning plate 14 is mounted together with the second partitioning plate 15 to the case body 11. The first partitioning plate 14 is formed with a slit 14b that is an insertion portion through which the stack bus bar 16 provided at one end in the stacking direction of the fuel cell stack 30 is inserted.

As shown in FIG. 7A, as with the first partitioning plate 14, the second partitioning plate 15 is formed by a plate-like member made from a material having a high electric insulation, a high heat resistance, and a high elasticity, and is configured be bonded to a wall surface portion at an upper position of the case body 11. In the present embodiment, the second partitioning plate 15 is formed by a synthetic resin material with softness, such as PET, and is configured to be bonded to the case body 11 with a double-sided tape. The second partitioning plate 15 has an overlapping portion 15a that partially overlaps the first partitioning plate 14 in a state in which the second partitioning plate 15 is mounted together with the first partitioning plate 14 to the case body 11. The second partitioning plate 15 is formed with a slit 15b that is an insertion portion through which the stack bus bar 16 provided at the other end in the stacking direction of the fuel cell stack 30 is inserted.

Figure 2A:
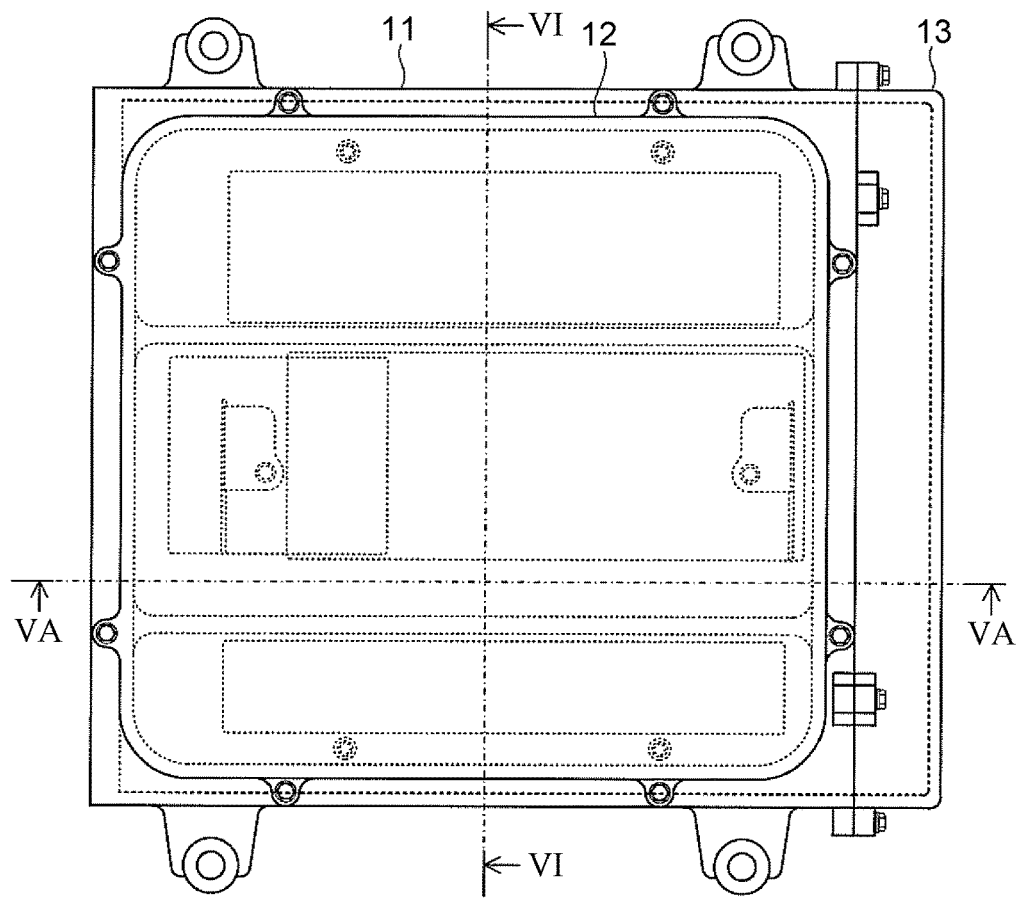
FIG. 2A is a plan view of the fuel cell housing case according to the embodiment of the present disclosure.
Figure 2B:
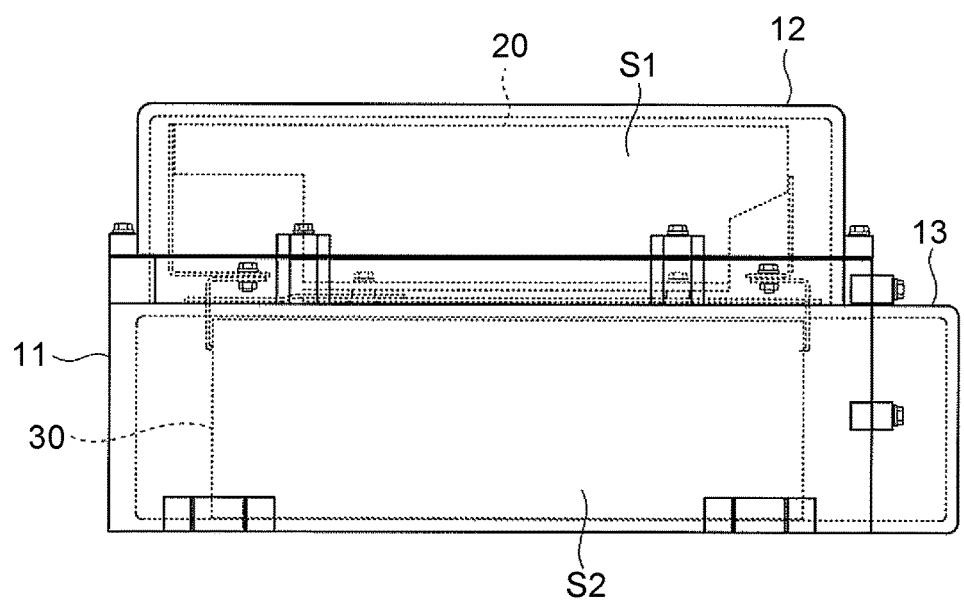
FIG. 2B is a side view of the fuel cell housing case according to the embodiment of the present disclosure.
Figure 3:
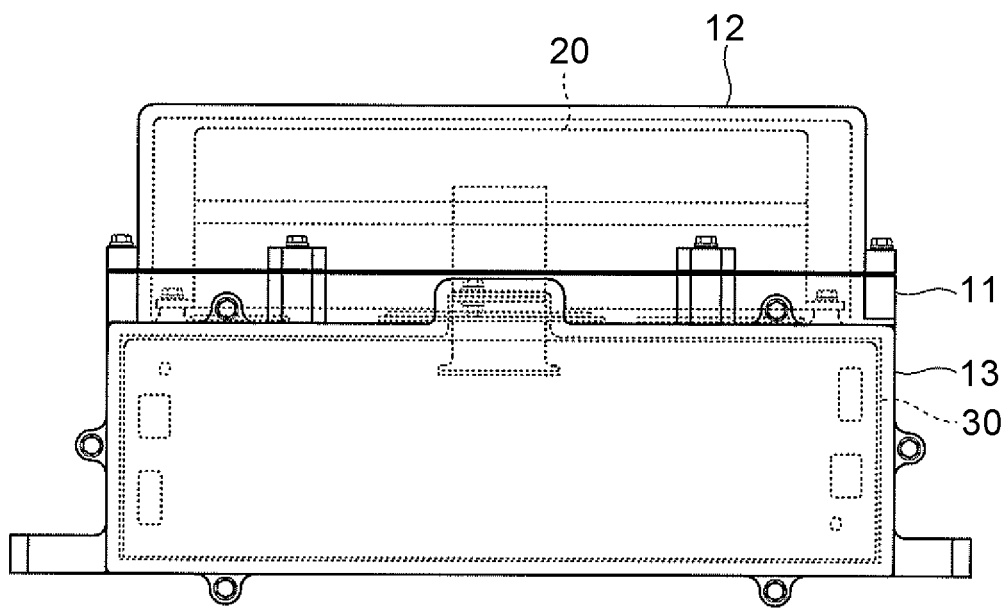
FIG. 3 is a front view of the fuel cell housing case according to the embodiment of the present disclosure.

As shown in FIG. 2B, the first partitioning plate 14 and the second partitioning plate 15 of the present embodiment have a function as partitioning plates that partition an inner space defined by the case body 11, the upper cover 12, and the front cover 13 into a space S1 in which the boost converter 20 is housed and a space S2 in which the fuel cell stack 30 is housed.

The slit 14b of the first partitioning plate 14 and the slit 15b of the second partitioning plate 15 of the present embodiment configure insertion portions through which bus bars of the fuel cell housing case according to the present disclosure are inserted. The shield plate 18A mounted on the opening 11c of the case body 11 and the shield plate 18B mounted on the opening 11d of the case body 11 have a function as partitioning plates that separate the space S1 and the space S2 from each other.

Figure 7B:
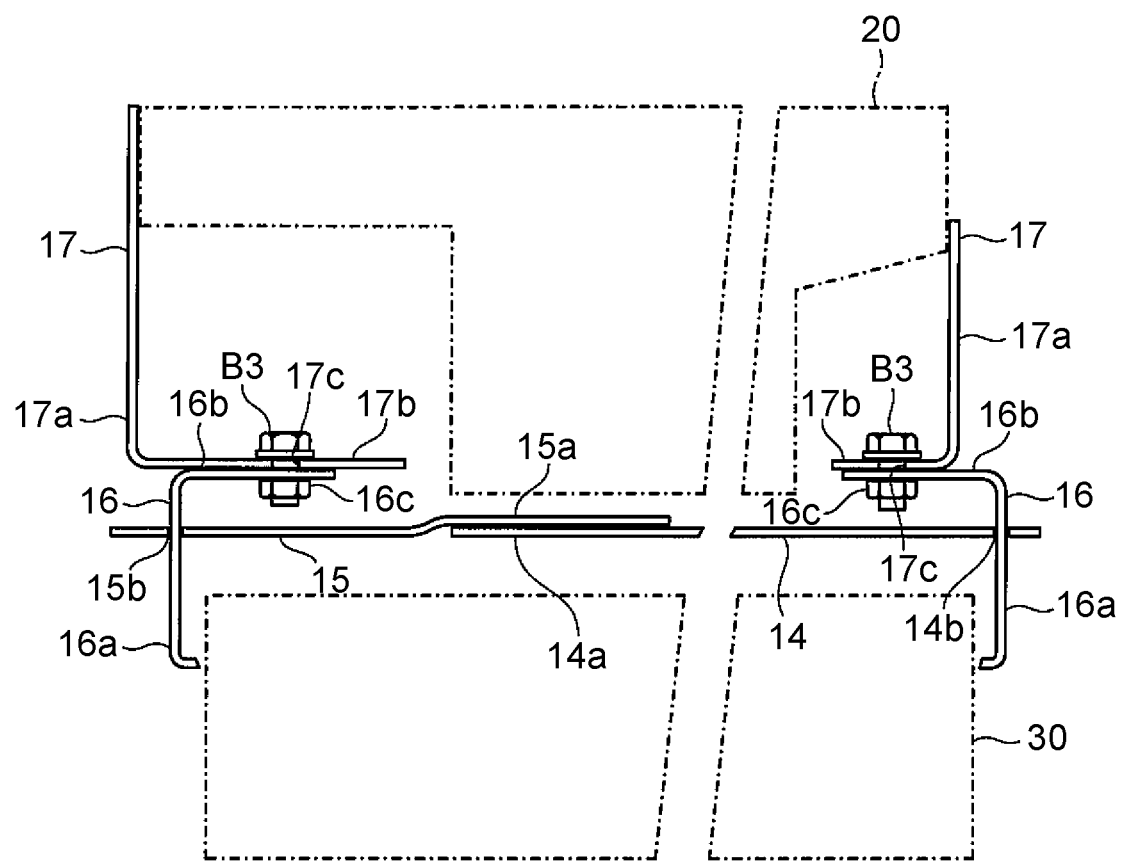
FIG. 7B is a view of a major part of the fuel cell housing case according to the embodiment of the present disclosure, and shows an enlarged side view of a bus bar joined part.

The pair of stack bus bars 16 are formed by a metallic material having a high electric conductivity, and as shown in FIG. 7B, the stack bus bars 16 are respectively provided on both lateral surfaces that are both ends in the stacking direction of the fuel cell stack 30. Each of the stack bus bars 16 includes: a vertical portion 16a extending in parallel to each lateral surface of the fuel cell stack 30; and a horizontal portion 16b bent at an upper end of the vertical portion 16a so that one end of the stack bus bar 16 and the other end of the stack bus bar 16 come closer to each other. As shown in FIG. 7A, the vertical portion 16a is inserted in the slit 14b of the first partitioning plate 14 or in the slit 15b of the second partitioning plate 15, to be fixed. A nut 16c is joined to each horizontal portion 16b.

The pair of unit bus bars 17 are formed by a metallic material having a high electric conductivity, as with the stack bus bars 16, and as shown in FIG. 7B, the unit bus bars 17 are provided on both lateral surfaces of the boost converter 20. Each of the unit bus bars 17 includes: a vertical portion 17a extending in parallel to each lateral surface of the boost converter 20; and a horizontal portion 17b bent at a lower end of the vertical portion 17a so that one end of the unit bus bar 17 and the other end of the unit bus bar 17 come closer to each other. The horizontal portions 17b are formed with through-holes 17c through which the bolt B3 are inserted.

The stack bus bars 16 and the unit bus bars 17 are configured such that the boost converter 20 is placed on the case body 11 so as to bring the horizontal portions 16b of the stack bus bars 16 and the horizontal portions 17b of the unit bus bars 17 to be in surface connect with each other, and in this state, the stack bus bars 16 and the unit bus bars 17 are fastened to each other with the bolts B3.

The boost converter 20 is electrically connected to the fuel cell stack 30 via the stack bus bars 16 and the unit bus bars 17, and includes a coil, a diode, a smoothing capacitor, and a switch that are not illustrated. The boost converter 20 has a configuration to boost voltage output from the fuel cell stack 30 to voltage suitable for a load element such as motor driving.

As shown in FIG. 1, the boost converter 20 is configured to include a case 20a in which respective components are housed, and is provided with four fixing portions 20b used for fixing the case 20a to the case body 11. Through-holes 20c into which the bolts B4 are to be inserted are formed in each of the fixing portions 20b.

The fuel cell stack 30 is configured by a stack formed by stacking not-illustrated multiple single fuel cells. The stack of the single fuel cells is housed in a case 30a, and not-illustrated fuel cell piping and air piping are connected to the case 30a. Each single fuel cell is configured to generate and output electric power by hydrogen (H) as a fuel gas supplied from a not-illustrated fuel gas supply apparatus via the fuel piping, and air ($O_2$) as an oxidant gas supplied from a compressor.

Figure 5A:
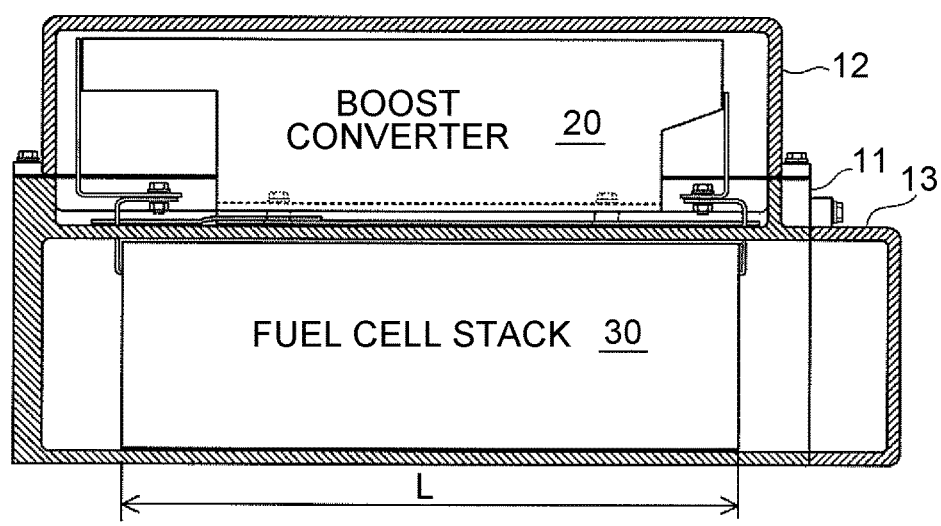
FIG. 5A is a sectional view taken along a line VA-VA of FIG. 2A, and shows a state in which there is no change in dimension of the fuel cell stack.
Figure 5B:
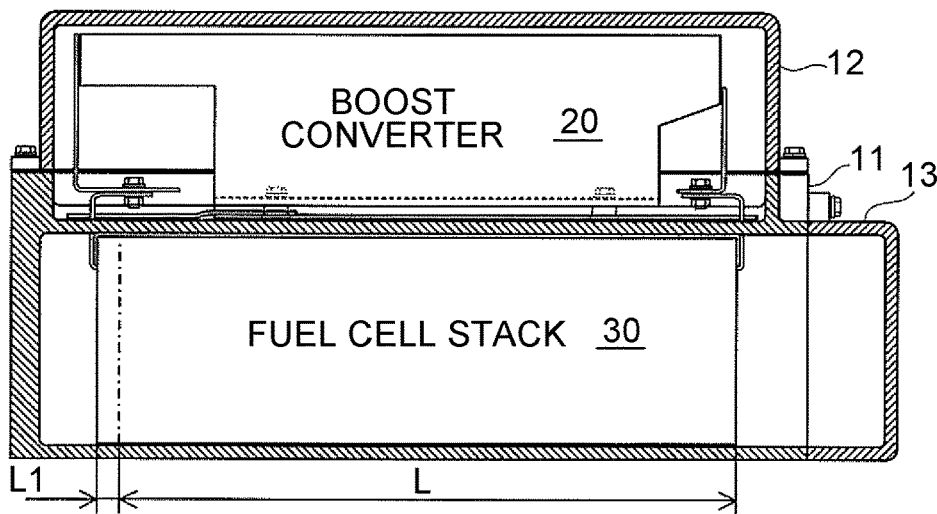
FIG. 5B shows a state in which the dimension of the fuel cell stack is increased.
Figure 5C:
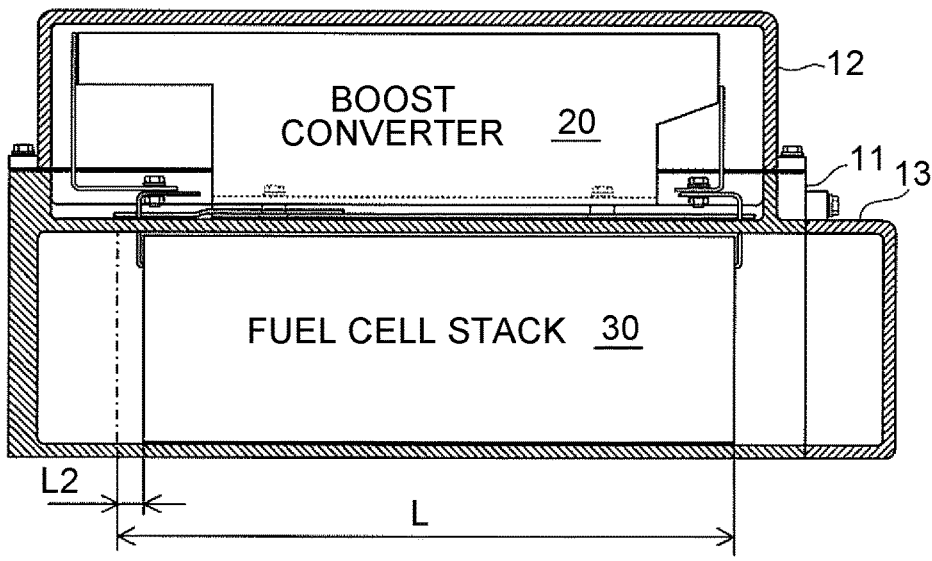
FIG. 5C shows a state in which the dimension of the fuel cell stack is decreased.
Figure 6:
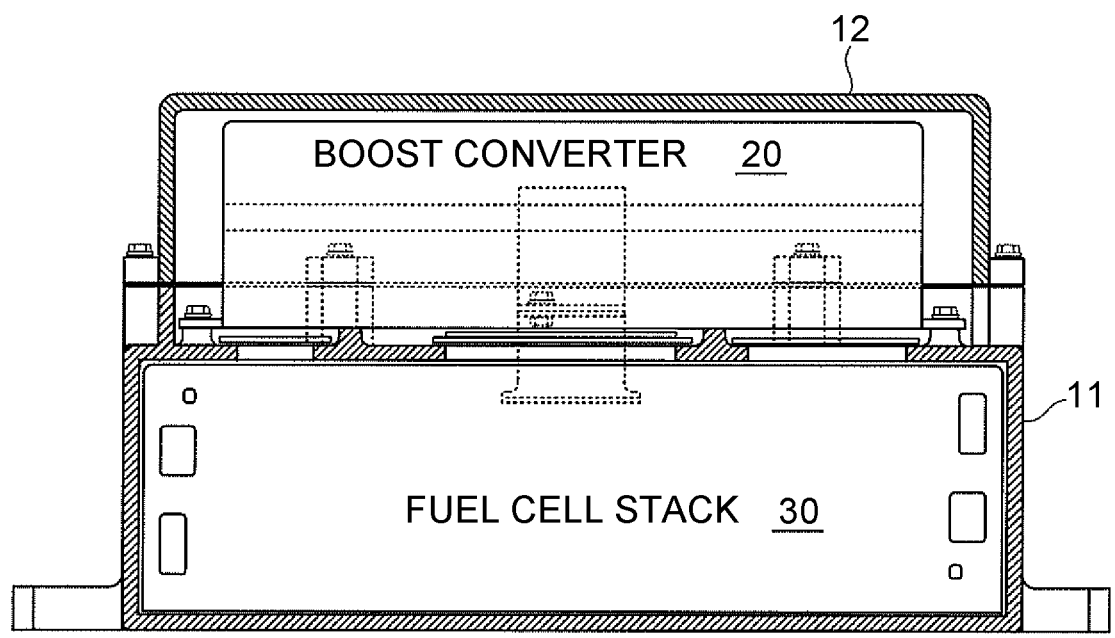
FIG. 6 is a sectional view taken along a line VI-VI of FIG. 2A.

There are variations in shape among individual single fuel cells included in the fuel cell stack 30, and thus the fuel cell stack 30 including multiple stacked single fuel cells has variations in dimension in its stacking direction. The dimension is increased or decreased within a range of L+L1 to L−L2 relative to a setting dimension L, as shown in FIG. 5A, 5B, 5C.

For example, when the fuel cell stack 30 has a length in the stacking direction of L+L1, a clearance between the stack bus bar 16 located on one side in the stacking direction of the fuel cell stack 30 and the stack bus bar 16 on the other side in the stacking direction becomes longer by +L1 relative to a preset reference distance. Therefore, the first partitioning plate 14 and the second partitioning plate 15 are located at positions where the dimension in the stacking direction of the fuel cell stack 30 deviates from the setting dimension of the fuel cell stack 30 in a direction of being away from each other along the stacking direction of the fuel cell stack 30, so that an overlapping area in which the overlapping portion 14a of the first partitioning plate 14 overlaps the overlapping portion 15a of the second partitioning plate 15 becomes decreased. Even when the first partitioning plate 14 and the second partitioning plate 15 are located at the above positions, the overlapping portion 14a of the first partitioning plate 14 overlaps the overlapping portion 15a of the second partitioning plate 15. Accordingly, the inner space defined by the case body 11, the upper cover 12, and the front cover 13 is maintained to be separated by the first partitioning plate 14 and the second partitioning plate 15.

In the meantime, when the fuel cell stack 30 has a length in the stacking direction of L−L2, a clearance between the stack bus bar 16 located on one side in the stacking direction of the fuel cell stack 30 and the stack bus bar 16 on the other side in the stacking direction of the fuel cell stack 30 becomes shorter by −L2 relative to the reference distance. Therefore, the first partitioning plate 14 and the second partitioning plate 15 are located at positions where the dimension in the stacking direction of the fuel cell stack 30 deviates from the setting dimension of the fuel cell stack 30 in a direction of being closer to each other along the stacking direction of the fuel cell stack 30, so that the overlapping area in which the overlapping portion 14a of the first partitioning plate 14 overlaps the overlapping portion 15a of the second partitioning plate 15 becomes increased. Even when the first partitioning plate 14 and the second partitioning plate 15 are located at the above positions, the overlapping portion 14a of the first partitioning plate 14 overlaps the overlapping portion 15a of the second partitioning plate 15. Accordingly, the inner space defined by the case body 11, the upper cover 12, and the front cover 13 is maintained to be separated by the first partitioning plate 14 and the second partitioning plate 15.

The overlapping portion 14a of the first partitioning plate 14 and the overlapping portion 15a of the second partitioning plate 15 may be bonded to each other. For example, by bonding the overlapping portion 14a of the first partitioning plate 14 to the overlapping portion 15a of the second partitioning plate 15, a gap is eliminated between the overlapping portion 14a of the first partitioning plate 14 and the overlapping portion 15a of the second partitioning plate 15, to thereby more securely prevent foreign matters coming from the boost converter 20 from being mixed into the fuel cell stack 30. The bonding of the overlapping portion 14a of the first partitioning plate 14 to the overlapping portion 15a of the second partitioning plate 15 enhances mechanical strengths of the first partitioning plate 14 and the second partitioning plate 15. The bonding of the overlapping portion 14a of the first partitioning plate 14 to the overlapping portion 15a of the second partitioning plate 15 can be carried out at the time of bonding and fixing the second partitioning plate 15 to the case body 11 after the first partitioning plate 14 is bonded and fixed to the case body 11.

In addition, the slit 14b of the first partitioning plate 14 and the slit 15b of the second partitioning plate 15 may be sealed by a seal member, such as a sealing compound and a tape. Since the slits 14b, 15b are sealed by the seal member, gaps thereof can be eliminated, so that it is possible to more securely prevent foreign matters coming from the boost converter 20 from being mixed into the fuel cell stack 30. The sealing of the slit 14b of the first partitioning plate 14 and the slit 15b of the second partitioning plate 15 may be carried out after the first partitioning plate 14 and the second partitioning plate 15 are bonded and fixed to the case body 11.

Next, brief description will be provided on the assembly procedure of the fuel cell housing case 10 according to the embodiment.

Figure 8A:
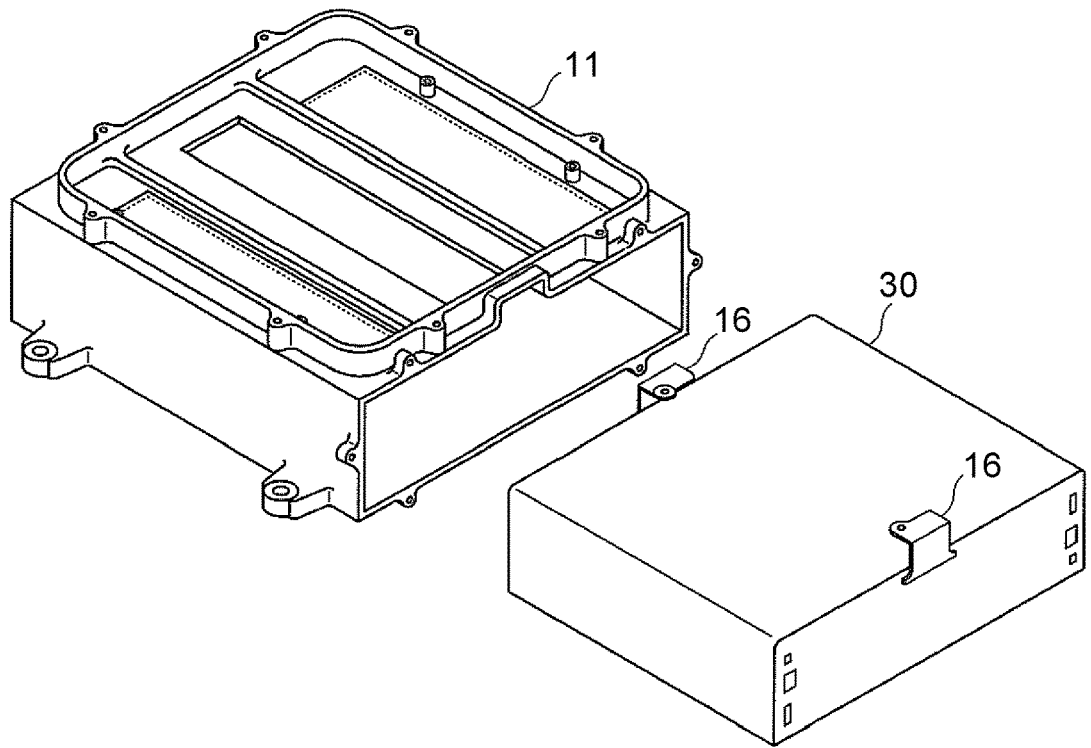
FIG. 8A is a perspective view of a case body of the fuel cell housing case according to the embodiment of the present disclosure, and shows a state before the fuel cell stack is inserted in a case body.
Figure 8B:
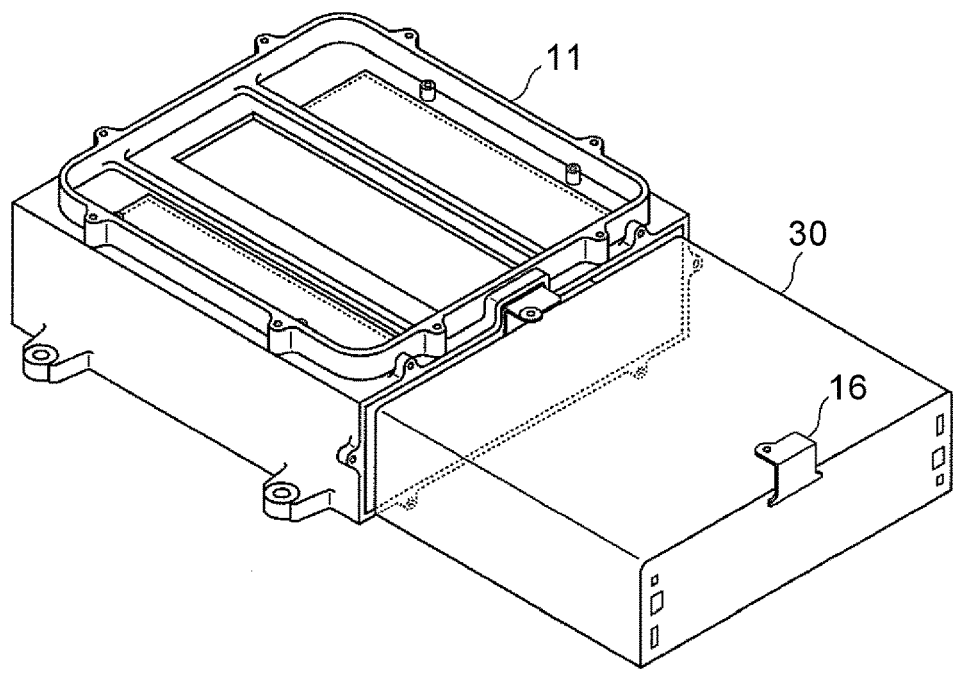
FIG. 8B is a perspective view of the case body of the fuel cell housing case according to the embodiment of the present disclosure, and shows a state in which a back surface of the fuel cell stack is inserted in an opening of the case body.
Figure 9A:
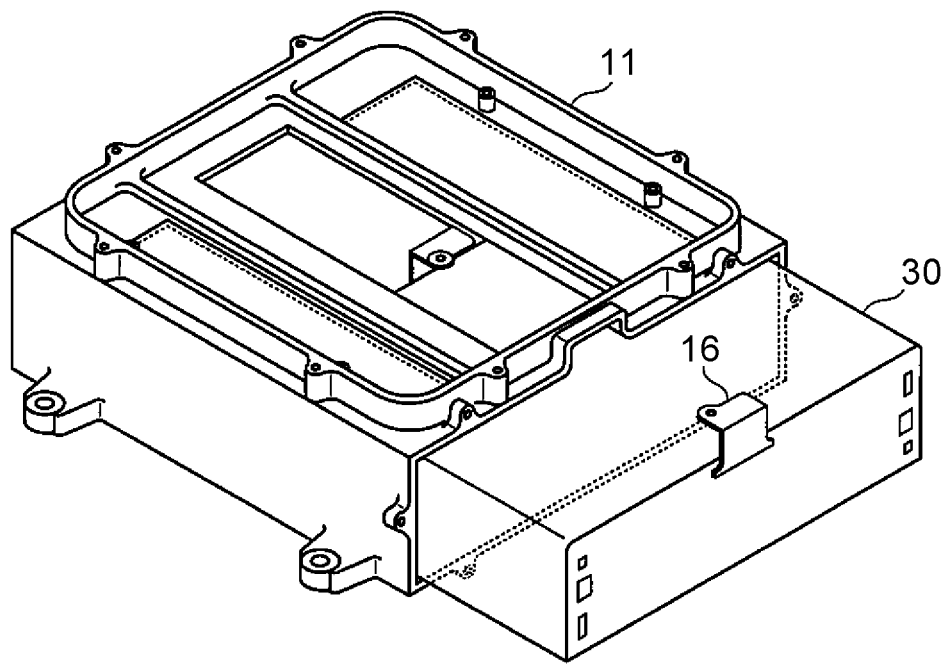
FIG. 9A is a perspective view of the case body of the fuel cell housing case according to the embodiment of the present disclosure, and shows a state in which a half of the fuel cell stack is inserted in the case body.
Figure 9B:
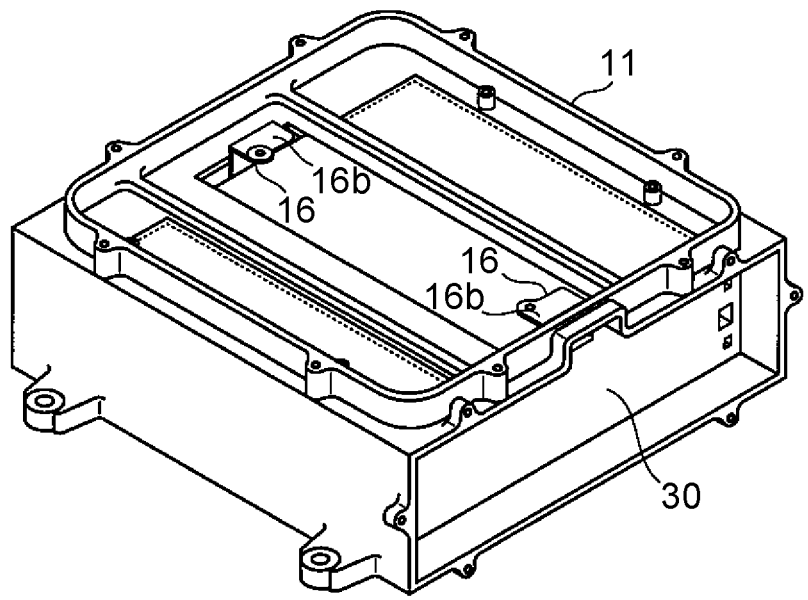
FIG. 9B is a perspective view of the case body of the fuel cell housing case according to the embodiment of the present disclosure, and shows a state in which the fuel cell stack is entirely inserted in the case body.

As shown in FIG. 8A, first, the case body 11 and the fuel cell stack 30 are prepared, and as shown in FIG. 8B, and the back surface of the fuel cell stack 30 is then inserted into the opening of the case body 11. Subsequently, as shown in FIG. 9A, the fuel cell stack 30 is pushed into the inside of the case body 11 such that the horizontal portions 16b of the stack bus bars 16 are exposed to the upper surface of the case body 11, as shown in FIG. 9B. The front cover 13 is then fastened to the case body 11 with the bolts B1. In this manner, the fuel cell stack 30 is fixed to the inside of the case body 11, and the assembly of the fuel cell stack 30 to the case body 11 is completed.

Next, as shown in FIG. 7A, FIG. 7B, the stack bus bar 16 is inserted into the slit 14b of the first partitioning plate 14. In the present embodiment, the vertical portion 16a of the stack bus bar 16 is inserted into the slit 14b. The first partitioning plate 14 is bonded and fixed to a wall surface portion at an upper position of the case body 11. The stack bus bar 16 is then inserted into the slit 15b of the second partitioning plate 15. In the present embodiment, the vertical portion 16a of the stack bus bar 16 is inserted into the slit 15b. The second partitioning plate 15 is bonded and fixed to a wall surface portion at an upper position of the case body 11.

In the first partitioning plate 14 and the second partitioning plate 15, the overlapping portion 15a of the second partitioning plate 15 overlaps the overlapping portion 14a of the first partitioning plate 14. The overlapping portion 14a of the first partitioning plate 14 and the overlapping portion 15a of the second partitioning plate 15 are bonded to each other. The bonding of the overlapping portion 14a of the first partitioning plate 14 to the overlapping portion 15a of the second partitioning plate 15 can be carried out by using a double-sided tape, for example. The slit 14b of the first partitioning plate 14 and the slit 15b of the second partitioning plate 15 are sealed by using a seal or a tape.

Next, as shown in FIG. 1, the boost converter 20 is mounted on a wall surface portion at an upper position of the case body 11, the positions of the fixing portions 20b of a case 20a of the boost converter 20 are brought to coincide with the positions of the bosses 11g formed to the wall surface portions at the upper positions of the case body 11, and then the fixing portions 20b are fastened to the case body 11 with the bolts B4. At this time, as shown in FIG. 7B, the horizontal portion 16b of each stack bus bar 16 and the horizontal portion 17b of each unit bus bar 17 come into a state of facing and being in contact with each other. In this state, the horizontal portions 16b of the both stack bus bars 16 are fastened to the horizontal portions 17b of the both unit bus bars 17 with the bolts B3. Then, the upper cover 12 is fastened to the case body 11 with the bolts B2, and the assembly of the fuel cell housing case 10 is thus completed.

Advantageous effects of the above-configured fuel cell housing case 10 according to the embodiment will be described.

The fuel cell housing case 10 according to the present embodiment includes: the stack case housing the fuel cell stack 30 and the boost converter 20; the pair of stack bus bars 16 provided at the both ends in the stacking direction of the fuel cell stack 30; the multiple partitioning plates partitioning the inside of the stack case into the space where the fuel cell stack 30 is housed and the space where the boost converter 20 is housed. These multiple partitioning plates include: the first partitioning plate 14 provided with the slit 14b through which the stack bus bar 16 on one side is inserted; and the second partitioning plate 15 provided with the slit 15b through which the stack bus bar 16 on the other side is inserted. The first partitioning plate 14 and the second partitioning plate 15 respectively have the overlapping portion 14a and the overlapping portion 15a that overlap each other in a state of being mounted on the stack case.

Therefore, when there are variations in dimension in the stacking direction of the fuel cell stack 30 due to individual differences, and when the clearance between the stack bus bars 16 on the both sides in the stacking direction is longer or shorter than the reference distance, the relative positions between the first partitioning plate 14 and the second partitioning plate 15 can be changed depending on the clearance. Even when the relative positions between the first partitioning plate 14 and the second partitioning plate 15 are changed, the overlapping between the overlapping portion 14a of the first partitioning plate 14 and the overlapping portion 15a of the second partitioning plate 15 can be maintained; therefore, it is possible to attain such an advantageous effect that the inner space defined by the case body 11, the upper cover 12, and the front cover 13 is maintained to be separated by the first partitioning plate 14 and the second partitioning plate 15. As a result, the advantageous effect to prevent foreign matters coming from the boost converter 20 from being mixed into the fuel cell stack 30 can be attained by using the first partitioning plate 14 and the second partitioning plate 15.

In the fuel cell housing case 10 according to the present embodiment, when the overlapping portion 14a of the first partitioning plate 14 and the overlapping portion 15a of the second partitioning plate 15 are bonded to each other, the gap between the overlapping portion 14a of the first partitioning plate 14 and the overlapping portion 15a of the second partitioning plate 15 is eliminated, thus attaining such an advantageous effect that more securely prevents foreign matters coming from the boost converter 20 from being mixed into the fuel cell stack 30.

In the fuel cell housing case 10 according to the present embodiment, when the slit 14b of the first partitioning plate 14 and the slit 15b of the second partitioning plate 15 are sealed, the respective gaps thereof are eliminated; therefore, it is possible to attain such an advantageous effect that more securely prevents foreign matters coming from the boost converter 20 from being mixed into the fuel cell stack 30.

As described above, an embodiment of the present disclosure has been described in detail, but the present disclosure is not limited to the above-described embodiment, and allows various design changes.

What is claimed is:

1. A fuel cell housing case comprising:
   a stack case including a housing, a first partitioning plate and a second partitioning plate that separate a first space in which a fuel cell stack including multiple stacked single fuel cells is to be housed from a second space in which a boost converter disposed above the fuel cell stack is to be housed; and
   a first bus bar and a second bus bar respectively provided on both ends in a stacking direction of the fuel cell stack and configured to electrically connect the fuel cell stack to the boost converter,
   wherein
   the first partitioning plate includes a first insertion portion through which the first bus bar is inserted,
   the second partitioning plate includes a second insertion portion through which the second bus bar is inserted, and
   the first partitioning plate and the second partitioning plate respectively include a first overlapping portion and a second overlapping portion that overlap each other in a state of being mounted on the stack case;
   wherein the first partitioning plate and the second partitioning plate are configured such that the first overlap portion and the second overlap portion overlap by an overlap length that is variable.

2. The fuel cell housing case according to claim 1, wherein the first overlapping portion and the second overlapping portion are bonded to each other.

3. The fuel cell housing case according to claim 1, wherein
   the first insertion portion includes a first slit, and the first slit is sealed, and
   the second insertion portion includes a second slit, and the second slit is sealed.

* * * * *